United States Patent

Niioka et al.

[15] 3,673,351

[45] June 27, 1972

[54] TAPE FEED INDICATOR DEVICE FOR A TAPE RECORDER

[72] Inventors: Takeharu Niioka, Yokohama; Ryoji Hosokawa, Kawasaki, both of Japan

[73] Assignee: Tokyo Shibaura Electric Co., Ltd., Kawasaki-shi, Japan

[22] Filed: March 26, 1971

[21] Appl. No.: 128,438

[30] Foreign Application Priority Data

March 27, 1970 Japan....................................45/28929

[52] U.S. Cl...............179/100.2 R, 179/100.2 MD, 274/4 D, 340/259, 340/271

[51] Int. Cl...........................................G08b 5/38, G11b 5/28

[58] Field of Search........179/100.2 R, 100.2 CA, 100.2 MD, 179/100.2 Z, 100.2 S; 274/4 A, 4 D, 4 F; 340/378, 271, 268, 263, 259

[56] References Cited

UNITED STATES PATENTS 3,588,375 6/1971 Martin..........................179/100.2 MD
3,592,476 7/1971 MacDonald............................274/4 A
3,140,359 7/1964 Rupard.........................179/100.2 MD

*Primary Examiner*—Terrell W. Fears
*Assistant Examiner*—Jay P. Lucas
*Attorney*—Kemon, Palmer & Estabrook

[57] ABSTRACT

A tape feed indicator device for a tape recorder comprising a switch for changing over a power source to a first or a second circuit in interlocking relationship with a device for changing a tape feed from a low to a high speed or vice versa; low tape feed indicator means included in the first circuit to be controlled by the power source; and means included in the second circuit for intermittently generating voltage when the second circuit is connected to the power source, thereby controlling the indication means by the intermittent voltage.

4 Claims, 3 Drawing Figures

INVENTORS
TAKEHARU NIIOKA
RYOJI HOSOKAWA
BY
Kemon, Palmer & Estabrook
Attorneys

INVENTORS
TAKEHARU NIIOKA
RYOJI HOSOKAWA
BY
Kemon, Palmer & Estabrook
Attorneys

TAPE FEED INDICATOR DEVICE FOR A TAPE RECORDER

BACKGROUND OF THE INVENTION

This invention relates to a tape feed indicator device for a tape recorder. There is widely used an endless loop cartridge type tape recorder as a car stereophone. This type of tape recorder generally has an endless tape recorded in four tracks. When a cartridge containing an endless loop tape carrying four tracks of data is inserted into the cartridge port of the tape recorder, there are separately reproduced said tracks of data by slowly feeding the recorded tape. The track of data which should be reproduced is indicated by an indication lamp provided on the tape recorder panel for each track. As in an ordinary tape recorder, the aforementioned endless loop cartridge type tape recorder is provided with not only a reproduction mechanism but also a feed mechanism for causing that part of the tape whose reproduction is not required to travel at a high speed.

Generally speaking, a tape recorder could be so designed as to detect the state of high speed feed by distinguishing sounds produced from the speaker. However, the prior art endless loop cartridge type tape recorder is so arranged as to stop the speaker operation when the tape is quickly carried forward, thus failing to indicate said high speed feed. With the aforesaid conventional type of tape recorder, therefore, it is impossible to make sure whether the tape is travelling at a high speed.

SUMMARY OF THE INVENTION

The primary object of this invention is to provide a tape feed indicator device for a tape recorder capable of selectively indicating by the same indication lamp whether the tape travels at a low or high speed.

Another object of the invention is to provide a tape feed indicator device for a tape recorder capable of selectively indicating a low or high speed tape feed with respect to the separate tape tracks.

According to this invention, there is provided a switch which is changed over to a first or second circuit in interlocking relationship with means for changing a tape feed from a low to a high speed or vice versa. To the first circuit is connected at least one indication lamp which, when the switch is changed over to the first circuit, is lighted by connection with a power source to indicate a low speed tape feed. The second circuit includes means which, when the switch is changed over to said second circuit, intermittently generates voltage to cause the indication lamp to flicker, thereby indicating a high speed tape feed.

This invention provides another indicator device wherein the first circuit consists of parallel circuits each containing one indication lamp connected in series and a second switch interlocking with means for selectively operating said parallel circuits according to the tape track which is to be reproduced, thereby indicating a low or high speed feed of the respective tracks.

DESCRIPTION OF THE PREFERRED EMBODIMENTS

Figure 1:
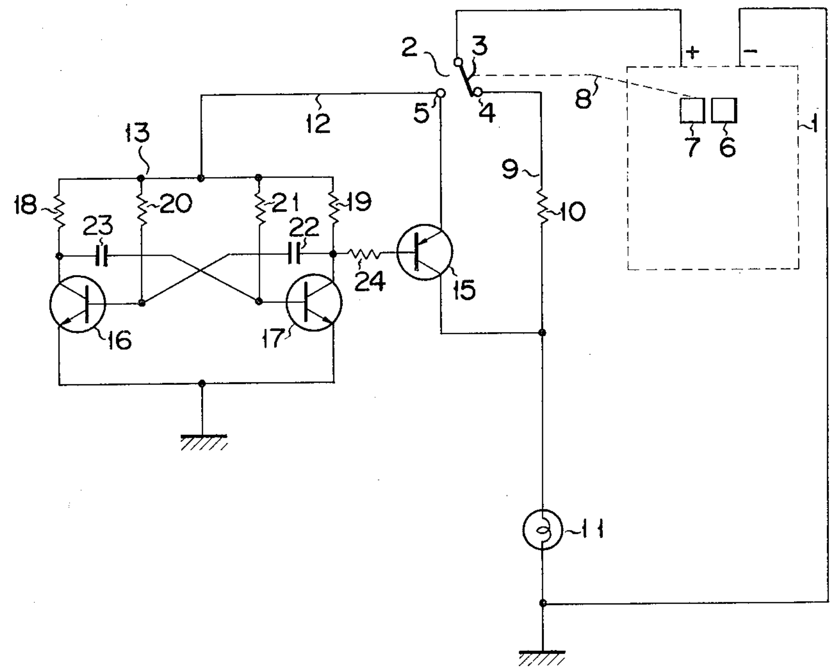
FIG. 1 is a circuit diagram of a tape feed indicator device according to an embodiment of this invention where the tape has a single track.

Referring to FIG. 1, a tape recorder 1 comprises a power source, tape, tape driving mechanism including low and high speed tape feed means, at least one indication lamp and reproduction head. Since, however, all these members are already known, they are not shown. For convenience of description, the main part of the tape feed indicator device of this invention which is operated in interlocking relationship with the interior mechanism of a tape recorder is here presented in the form removed from the recorder. However, the indicator device of the invention may sometimes be received in the recorder casing. The movable contact strip 3 of a first switch 2 connected to the positive pole of a power source (not shown) is switched to either of the fixed contacts 4 and 5. The movable contact strip 3 is combined with, for example, mechanical means 8 interlocking with low and high speed tape feed push buttons 6 and 7 mounted on a tape recorder, thereby causing said contact strip 3 to contact the fixed contact 4 upon depression of the push button 6 and the fixed contact 5 upon depression of the push button 7. Said interlocking mechanism 8 permits the use of cam means having, for example, the known construction and operated in interlocking relationship with the push buttons 6 and 7. A first circuit 9 connected to the fixed contact 4 consists of a resistor 10 and indication lamp 11 connected in series, the other end of the indication lamp 11 being connected to the negative pole of the power source. Accordingly, when the push button 6 is depressed to bring the movable contact strip 3 into contact with the fixed contact 4, that is, when the tape travels at a low speed, the indication lamp 11 is lighted to show said low speed feed. The fixed contact 5 is connected to the second circuit 12 which includes an astable multivibrator 13 and also a transistor 15 whose emitter electrode is connected to the fixed contact 5, whose collector electrode is connected to the midpoint of a line connecting the resistor 10 and indication lamp 11 and whose base electrode is connected to the astable multivibrator 13 through a resistor 24.

The astable multivibrator 13 comprises transistors 16 and 17 whose emitter electrodes are grounded, resistors 18 and 19 connected between the fixed contact 5 and the respective collector electrodes of said transistors 16 and 17, resistors 20 and 21 connected between the fixed contact 5 and the respective base electrodes of said transistors 16 and 17, a condenser 22 connected between the base electrode of the transistor 16 and the collector electrode of the transistor 17 and a condenser 23 connected between the base electrode of the transistor 17 and the collector electrode of the transistor 16. Output from said multivibrator 13 is supplied to the base electrode of the transistor 15 through a resistor 24.

Under the aforementioned arrangement, depression of the push button 6 causes the tap to travel at a low speed and at the same time the movable contact strip 3 to contact the fixed contact 4, as illustrated, so that the indication lamp 11 is lighted to show that the tape is carried forward at a low speed. Depression of the push button 7 for high speed feed of that part of the tape whose reproduction is not required causes the movable contact strip 3 to be pressed against the fixed contact 5. At this time, the multivibrator 13 starts operation to actuate the transistors 15 and 16 alternately. Pulse output from said multivibrator 13 is supplied to the base electrode of the transistor 15. When the transistor 17 is turned off, its collector electrode has the same voltage as the source voltage. When said transistor 17 is conversely turned on, its collector voltage is brought to a grounding level. Accordingly, the transistor 15 is operated in the same manner as the transistor 17. The indication lamp 11 flickers in response to the intermittent energization of the transistor 15, showing the high speed feed of the tape. The flickering period of the indication lamp 11 can be determined as desired by the known process used in changing the intermittent energization period of the astable multivibrator 13.

It is possible to replace the aforementioned multivibrator 13 by a relaxation oscillator consisting of a unijunction transistor to generate periodic pulses and intermittently actuate the transistor 15 with said pulses, or by a blocking oscillator for similar intermittent energization of the transistor 15 with output pulses from said oscillator. Further where the indication lamp 11 consumes extremely small amounts of power, it may be made to flicker simply with output from an oscillator itself.

There will now be described by reference to FIG. 2 a tape feed indicator device according to another embodiment of this invention which can show the low and high speed feed of the tape with respect to the individual tape tracks. The same parts of FIG. 2 as those of FIG. 1 are denoted by the same numerals and description thereof is omitted.

Figure 2:
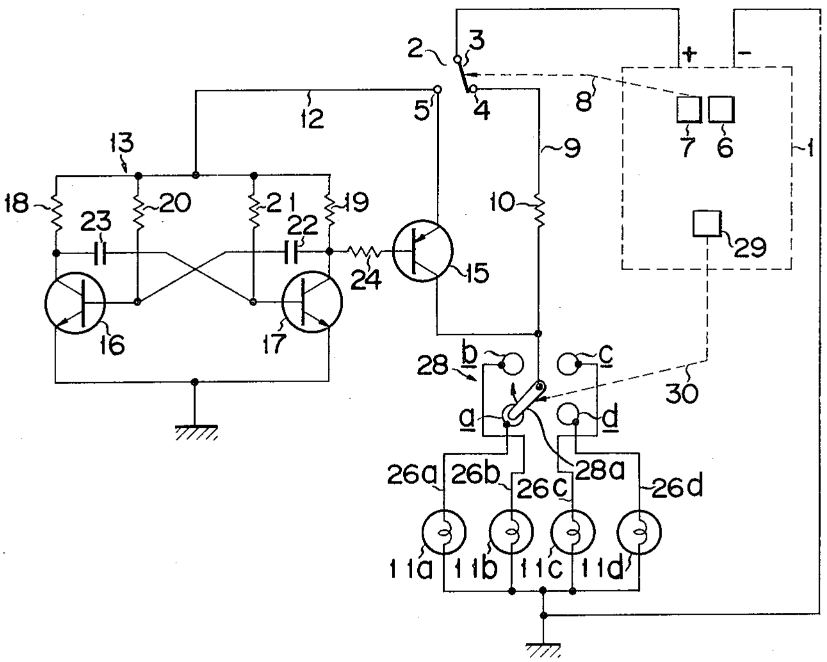
FIG. 2 is a circuit diagram of a tape feed indicator device according to another embodiment of the invention where the tape has a plurality of tracks.

Referring to FIG. 2, the first circuit 9 comprises parallel circuits provided in a number corresponding to that of the tape tracks (26*a* to 26*d* in case of four tape tracks) and including series connected indication lamps 11*a* to 11*d* respectively; and a second switch 28 consisting of a movable contact strip 28*a* and fixed contacts *a* to *d*. The line to which there are jointly connected the indication lamps 11*a* to 11*d* is connected to the negative pole of a power source (not shown). The tape recorder 1 is provided with a push button 29 for locating a magnetic head on the desired tape track. In the recorder is received a plunger (not shown) actuated by a solenoid excited each time said push button 29 is depressed. Each action of said plunger causes the movable contact strip 28*a* to contact the fixed contacts *a* to *d* in turn. In the recorder there is also placed cam means or track changing means for locating the magnetic head on the desired tape track. This interlocking mechanism is schematically indicated in dotted lines 30.

Figure 3:
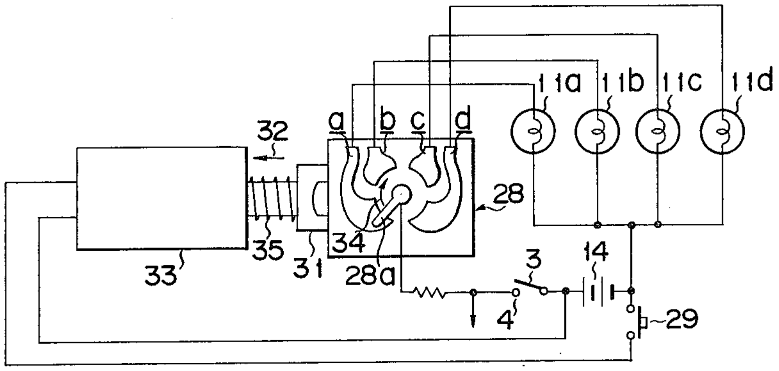
FIG. 3 represents the arrangement of means according to an embodiment of the invention for switching indication lamp circuits by selectively interlocking with the tape tracks.

There will now be further detailed the embodiment of FIG. 2 by reference to FIG. 3 in which the same parts as those of FIG. 2 are denoted by the same numerals. There is provided a solenoid 33 which attracts a plunger 31 in the direction of the arrow 32 upon depression of the push button 29. There is also provided a cam feed mechanism (not shown) for rotating the movable contact strip 28*a* to the fixed contacts *a* to *d* one after another in the direction of the arrow 34 for each actuation of the solenoid 33. While the plunger 31 is brought back to its original position due to the action of a spring 35 when the push button 29 is released, the position of the movable contact strip 28*a* remains unchanged. There is further provided a head-locating mechanism (not shown) integrally formed with the cam feed mechanism or interlockingly operable therewith so as to move the magnetic head to the desired tape track. If, therefore, the fixed contacts *a* to *d* are made in advance to match the tape tracks respectively, then depression of the push button 29 enables only one of the indication lamps 11*a* to 11*d* to be connected to the first circuit according to the track on which the magnetic head is positioned. For example, the movable contact strip 28*a* is made to contact the fixed contact *a* by depression of the push button 29 and the movable contact strip 3 is brought into contact with the fixed contact 4 by depression of the push button 6, then the indication lamp 11*a* is lighted to indicate that the track corresponding to the fixed contact *a* is being reproduced. Further, depression of the push button 7 causes the indication lamp 11*a* to flicker as described above to show that the tape is travelling at a high speed.

It will be apparent that the tape feed indicator device of this invention is applicable not only to an endless loop cartridge type tape recorder, but also to a cassette type tape recorder permitting recording or rewinding.

What we claim is:

1. For use with a tape recorder of the type having a source of voltage and switch means to produce low and high tape speeds, a tape feed indicator comprising:

visual indication means;

an intermittent voltage generating circuit; and a switch interlocked with the switch means of the tape recorder for connecting said visual indication means directly to the voltage source of the recorder to produce a steady state indication corresponding to one speed of tape travel and for connecting said visual indication means to the power source through said intermittent voltage generating circuit to produce an intermittent indication corresponding to a different speed of tape travel.

2. A tape feed indicator as defined by claim 1 in which said visual indication means comprises an indicator light.

3. A tape feed indicator as defined by claim 1 in which said intermittent voltage generating circuit comprising an astable multi-vibrator.

4. For use with a tape recorder of the type having a source of voltage, first switch means to produce low and high tape speeds, and second switch means to position a head over a desired one of a plurality of tracks on the tape, a tape feed indicator comprising:

a plurality of indicator lights equal in number to the number of tracks on the tape;

an intermittent voltage generating circuit;

a first switch interlocked with the second switch means to select one of said indicator lights corresponding to the tape track being used; and a second switch interlocked with the first switch means to energize that indicator light selected by said first switch directly from the voltage source of the recorder to produce a steady state indication corresponding to one speed of tape travel and for connecting the selected one of said indicator lights to the voltage source through said intermittent voltage generating circuit to produce an intermittent indication corresponding to a different speed of tape travel.

* * * * *